United States Patent [19]

Stiles

[11] Patent Number: 4,541,822
[45] Date of Patent: Sep. 17, 1985

[54] BELT CONSTRUCTION, TRANSVERSE BELT ELEMENT THEREFOR AND METHOD OF MAKING THE SAME

[75] Inventor: Carl A. Stiles, Springfield, Mo.
[73] Assignee: Dayco Corporation, Dayton, Ohio
[21] Appl. No.: 562,551
[22] Filed: Dec. 19, 1983
[51] Int. Cl.$^4$ .............................................. F16G 1/00
[52] U.S. Cl. .................................... 474/201; 474/242
[58] Field of Search ........................ 474/201, 242, 244

[56] References Cited

U.S. PATENT DOCUMENTS

| 2,365,988 | 12/1944 | Abbott | 474/201 |
| 4,080,841 | 3/1978 | Vollers | 474/201 |
| 4,313,730 | 2/1982 | Cole, Jr. et al. | 474/201 |
| 4,365,965 | 12/1982 | Russ | 474/201 X |
| 4,371,361 | 2/1983 | Giacosa | 474/201 |

FOREIGN PATENT DOCUMENTS

| 256918 | 9/1948 | Switzerland . | |
| 2087032 | 5/1982 | United Kingdom | 474/201 |

Primary Examiner—James A. Leppink
Assistant Examiner—Frank H. McKenzie, Jr.
Attorney, Agent, or Firm—Joseph V. Tassone

[57] ABSTRACT

An endless power transmission belt construction and a transverse element therefor as well as a method of making the same are provided, the belt construction comprising an endless flexible carrier and a plurality of transverse belt elements assembled on the carrier. Each belt element has a recess therein defining an intermediate transverse shoulder for engaging the inside surface of the carrier and a pair of inwardly facing shoulders confining the carrier therebetween, each inwardly facing shoulder having an opening interrupting the same and being aligned with the opening in the other inwardly facing shoulder of its respective element. Each belt element has a pin provided with opposed ends respectively disposed in the openings of the inwardly facing shoulders thereof whereby the carrier is confined between the pin and the transverse shoulder of each belt element. The pin of each belt element has its opposed ends snap-fitted into the respective openings of the inwardly facing shoulders thereof.

20 Claims, 8 Drawing Figures

BELT CONSTRUCTION, TRANSVERSE BELT ELEMENT THEREFOR AND METHOD OF MAKING THE SAME

BACKGROUND OF THE INVENTION

1. Field of the Invention

This invention relates to an improved endless power transmission belt construction and to a transverse belt element therefor as well as to a method of making such a belt construction.

2. Prior Art Statement

It is known to provide an endless power transmission belt construction comprising an endless flexible carrier means having an inside surface means and an outside surface means, and a plurality of transverse belt elements assembled on the carrier means. Each belt element has a recess therein defining an intermediate transverse shoulder means for engaging the inside surface means of the carrier means and a pair of inwardly facing shoulder means confining the carrier means therebetween, each inwardly facing shoulder means having an opening interrupting the same and being aligned with the opening in the other inwardly facing shoulder means of its respective belt element. Each belt element has a pin provided with opposed ends respectively disposed in the openings of the inwardly facing shoulder means thereof whereby the carrier means is confined between the pin and the transverse shoulder means of each belt element. For example, see the U.S. patent to Vollers, U.S. Pat. No. 4,080,841 and the U.S. patent to Cole Jr., et al, U.S. Pat. No. 4,313,730.

The Swiss Pat. No. 256,918 illustrates in FIGS. 1 and 4 thereof a transverse belt element that has the carrier means held in the recess thereof by an elastic band inserted into lateral grooves formed in the inwardly facing shoulder means of the belt element.

SUMMARY OF THE INVENTION

It is one feature of this invention to provide an improved endless power transmission belt construction which is particularly adapted to be utilized for continuously variable transmission purposes and the like.

In particular, it is believed according to the teachings of this invention that each transverse belt element for such an endless power transmission belt construction can have the pin that confines the carrier means thereof in the recess thereof be snap-fitted into the opposed openings formed in the inwardly facing shoulder means of that belt element to facilitate the assembly of that belt element to its carrier means.

For example, one embodiment of this invention provides an endless power transmission belt construction comprising an endless flexible carrier means having an inside surface means and an outside surface means, and a plurality of transverse belt elements assembled on the carrier means, each belt element having a recess therein defining an intermediate transverse shoulder means for engaging the inside surface means of the carrier means and a pair of inwardly facing shoulder means confining the carrier means therebetween. Each inwardly facing shoulder means has an opening interrupting the same and being aligned with the opening in the other inwardly facing shoulder means of its respective belt element. Each belt element has a pin provided with opposed ends respectively disposed in the openings of the inwardly facing shoulder means thereof whereby the carrier means is confined between the pin and the transverse shoulder means of each belt element. The pin of each belt element has its opposed ends snap-fitted into the respective opening means of the inwardly facing shoulder means thereof.

Accordingly, it is an object of this invention to provide an improved power transmission belt construction having one or more of the novel features of this invention as set forth above or hereinafter shown or described.

Another object of this invention is to provide an improved method of making such a power transmission belt construction, the method of this invention having one or more of the novel features of this invention as set forth above or hereinafter shown or described.

Another object of this invention is to provide an improved transverse belt element for such a power transmission belt construction or the like, the transverse belt element of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
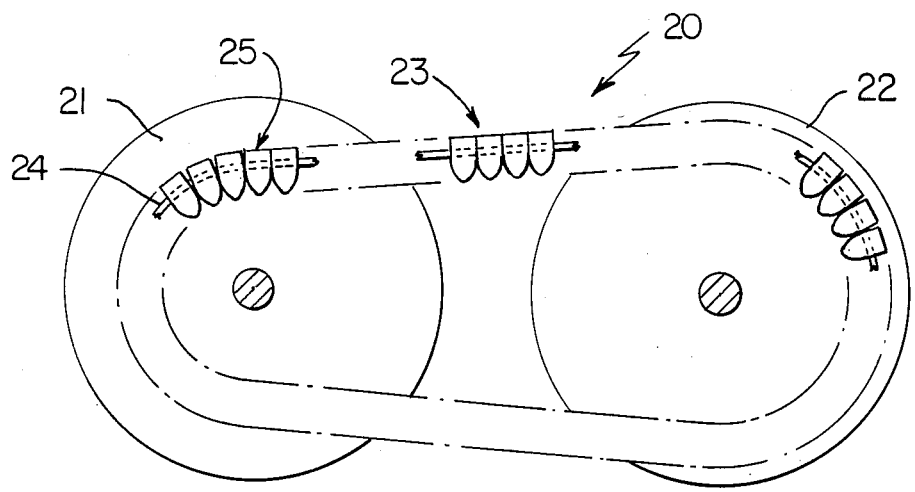
FIG. 1 is a schematic side view of a transmission means that includes the improved endless power transmission belt construction of this invention.

While the various features of this invention are hereinafter illustrated and described as providing an endless power transmission belt construction particularly adapted to be utilized for continuously variable transmission purposes, it is to be understood that the various features of this invention can be utilized singly or in any combination thereof to provide a belt construction for other uses as desired.

Therefore, this invention is not to be limited to only the embodiments illustrated in the drawings, because the drawings are merely utilized to illustrate one of the wide variety of uses of this invention.

Referring now to FIG. 1, a conventional continuously variable transmission arrangement is generally indicated by the reference numeral 20 and comprises a pair of rotatable pulleys 21 and 22, one of which is to be driven by the other thereof by means of an endless power transmission belt construction of this invention that is generally indicated by the reference numeral 23 and which operates in a manner conventional in the art. The pulleys 21 and 22 have variable diameters in a manner well known in the art whereby a continuously variable transmission is provided by the arrangement 20 in the manner well known in the art and as set forth in the aforementioned U.S. patent to Vollers, U.S. Pat. No. 4,080,841; the U.S. patent to Cole Jr., et al, U.S. Pat. No. 4,313,730 and the Swiss Pat. No. 256,918 whereby these two U.S. patents and the Swiss patent are being incorporated into this disclosure by this reference thereto.

Since the operation of a continuously variable power transmission arrangement is well known in the art, a further description of the arrangement 20 need not be set forth as the features of this invention are directed to the endless power transmission belt 23 and will now be described.

The endless power transmission belt construction 23 of this invention comprises an endless carrier means that is generally indicated by the reference numeral 24 and a plurality of transverse belt elements 25 carried by the carrier means 24 in a manner hereinafter set forth.

Figure 4:
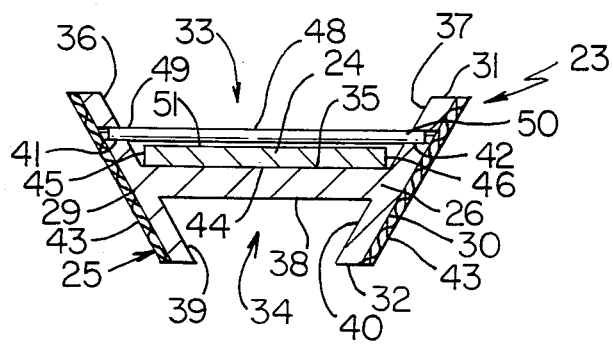
FIG. 4 is an enlarged cross-sectional view taken on line 4—4 of FIG. 2.

Each transverse belt element 25 of this invention defines a substantially trapezoidal configuration when viewed in the manner illustrated in FIG. 4, each belt element 25 comprising a one-piece block of material 26 provided with a front face 27 and a rear face 28 as well as opposed side faces or surfaces 29 and 30 with the side surfaces 29 and 30 being substantially flat and angled relative to each other to define a substantially V "shape" for each belt element 25.

Each block of material 26 also has a top face or side 31 and an opposed bottom face or side 32 with the sides 31 and 32 being respectively interrupted by recesses 33 and 34 with each recess 33 and 34 defining a substantially trapezoidal configuration when viewing the belt element 25 in the manner illustrated in FIG. 4.

The recess 33 in the top side 31 of each block of material 26 defines a substantially transverse shoulder means 35 and a pair of opposed inwardly facing shoulder means 36 and 37 which are respectively disposed substantially parallel to the adjacent outside surface means 29 and 30 and thereby are substantially flat and converge toward each other as they approach the transverse shoulder means 35.

The recess 34 in the bottom side 32 of each belt element 25 also defines a transverse shoulder means 38 and a pair of inwardly facing shoulder means 39 and 40 with the shoulder means 39 and 40 diverging away from each other as the same approach the transverse shoulder means 38 while being substantially flat and substantially parallel with the respective outside surface means 29 and 30 as illustrated in FIG. 4.

Each block of material 26 of each belt element 25 has the inwardly facing shoulder means 36 and 37 thereof respectively interrupted by opening means 41 and 42 which respectively also interrupt the outside surface means 29 and 30 as illustrated in FIG. 4. However, each belt element 25 has any suitable friction material 43 secured in any suitable manner to the sides 29 and 30 throughout the entire length thereof so that the friction material 43 completely covers the openings 41 and 42 at the outside surface 29 and 30 of the block of material 26 in the manner illustrated in FIG. 4 and for a purpose hereinafter described.

The friction material 43 can be any friction material that is conventional in the art, such as a fabric material that has been impregnated with a polymeric material, and the same is adapted to be secured to the blocks 26 in any suitable manner before the blocks 26 are assembled to the carrier means 24.

Also, the blocks 26 can be formed from any suitable polymeric material, metallic material, or be a composite of materials as desired and while the carrier means 24 is illustrated as being a single band of material, the same can comprise a single band or a plurality of bands as is conventional in the art and can be formed of any suitable polymeric material, metallic material or combinations of materials as desired.

Figure 5:
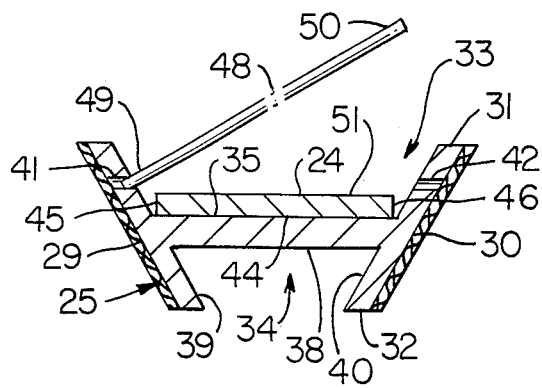
FIG. 5 is a view similar to FIG. 4 and illustrates one of the steps in the method of this invention for making the belt construction of FIG. 4.

In any event, when it is desired to assemble the transverse belt elements 25 of this invention to the carrier means 24, each belt element 25 is assembled to the carrier means 24 by having the carrier means 24 fully received in the recess 33 thereof so as to have the lower or inner surface means 44 thereof be disposed against the transverse shoulder means 35 as illustrated in FIG. 5 whereby the opposed ends 45 and 46 of the carrier means 24 are confined between the inwardly facing shoulder means 36 and 37 of the respective belt element 25.

Figure 6:
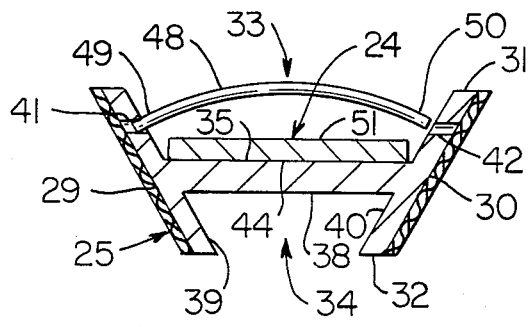
FIG. 6 is a view similar to FIG. 5 and illustrates another step in the method of making the belt construction of FIG. 4.

Thereafter, a resilient metallic pin 48 having opposed ends 49 and 50 is inserted into the recess 33 in such a manner that the opposed ends 49 and 50 of the pin 48 are snap-fitted into the respective openings 41 and 42 in the inwardly facing surface means 36 and 37 in the manner illustrated in FIGS. 5 and 6 so that the pin 48 is disposed closely adjacent the upper or outer surface means 51 of the carrier means 24 to hold the carrier means 24 between the pin 48 and the transverse shoulder means 35 in the manner illustrated in FIG. 4, the friction material 43 holding the pin 48 in its assembled position in the openings 41 and 42 as the friction material completely covers the openings 41 and 42 at the surfaces 29 and 30.

While the pin 48 can be snap-fitted into place in the manner illustrated in FIG. 4 in any suitable manner, one such method is to first insert one of the ends, such as the end 48 into its respective opening 41 in the manner illustrated in FIG. 5, and then slightly bow the pin 48 so that the other end 50 can be slipped into the opening 42 in the inwardly facing shoulder means 37 in the manner illustrated in FIG. 6 so that the pin 48 will be snap-fitted into place in a simple and effective manner. The wide opening of the recess 33 readily permits the insertion of the pin 48 therein which would not be the case if the shoulder means 36 and 37 did not diverge away from each other as they approach the other surface means 31 of the belt element 25.

When all of the belt elements 25 have been assembled on the carrier means 24 in the manner previously described by utilizing a pin 48 for each belt element 25, it can be seen that the resulting endless power transmission belt construction 23 of this invention is adapted to be utilized in the continuously variable transmission means 20 of FIG. 1 in a manner conventional in the art whereby further discussion of the operation of the belt construction 23 of this invention is not necessary.

Figure 2:
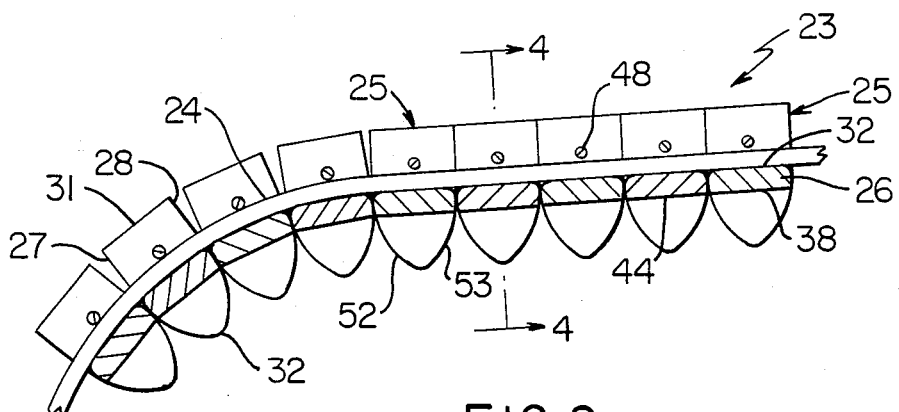
FIG. 2 is an enlarged cross-sectional view of a portion of the endless power transmission belt construction of FIG. 1.
Figure 3:
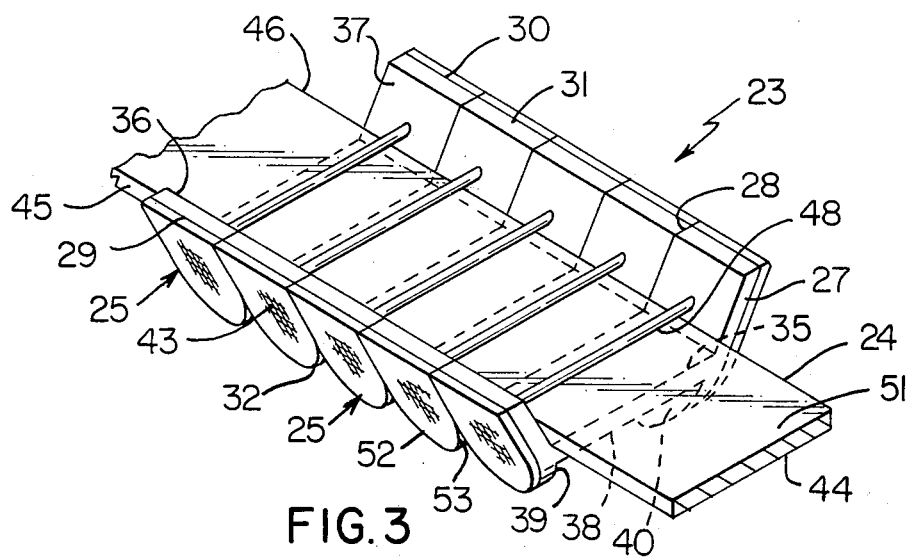
FIG. 3 is a fragmentary top perspective view of part of the belt construction of FIG. 2.

However, it can readily be seen in FIG. 2 that each belt element 25 has the portion thereof below the transverse shoulder means 35 on the front and rear sides 27 and 28 thereof formed arcuately as respectively represented by the reference numerals 52 and 53 to permit the belt elements 25 to readily move around the small diameters of the pulleys 21 and 22 when the belt elements 25 reach the same in the manner illustrated in FIGS. 1 and 2 and as is well known in the art.

While each belt element 25 of this invention has been previously described as having the friction material 43 thereof cover the openings 41 and 42 at the outer surfaces 29 and 30 of the block of material 26 so as to hold the respective pin 48 in place, it is to be understood that the openings 41 and 42 could terminate short of the surfaces 29 and 30 of the block 26 of the belt element 25 if desired.

Figure 7:
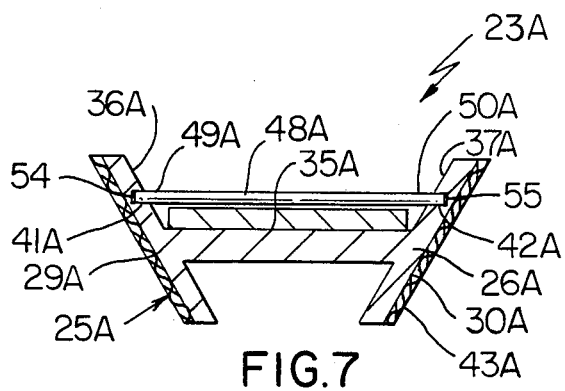
FIG. 7 is a view similar to FIG. 4 and illustrates another embodiment of the improved endless power transmission belt construction of this invention.

For example, reference is now made to FIG. 7 wherein another belt construction of this invention is generally indicated by the reference numeral 23A and parts thereof similar to the belt construction 23 previously described are indicated by like reference numerals followed by the reference letter "A".

As illustrated in FIG. 7, the openings 41A and 42A in the inwardly facing surface means 36A and 37A of the block 26A of the belt element 25A respectively terminate short of the outer surface 29A and 30A of the block 26A so as to define internal shoulders 54 and 55 in the openings 41A and 42A. However, the opposed ends 49A and 50A of the pin 48A, when snap-fitted into the openings 41A and 42A, are still short of the shoulders 54 and 55 as illustrated in FIG. 7 so that by having the openings 41A and 42A terminate short of the surfaces 29A and 30A, the friction material 43 is merely utilized for its normal purpose and not also for the purpose of holding the pin 48A in position. In fact, the belt element 25A of FIG. 7 can be utilized without the friction material 43A if desired as the pin 48A thereof will remain in position in the same manner as the pin 48 previously described.

While the belt elements 25 and 25A of this invention have been described as utilizing the pins 48 and 48A to permit the same to be assembled to the carrier means 24 or 24A in the manner previously described, it is to be understood that either the belt element 25 or the belt element 25A can be utilized in a manner wherein the carrier means is fastened directly to the transverse shoulder means 35 or 35A thereof if desired.

Figure 8:
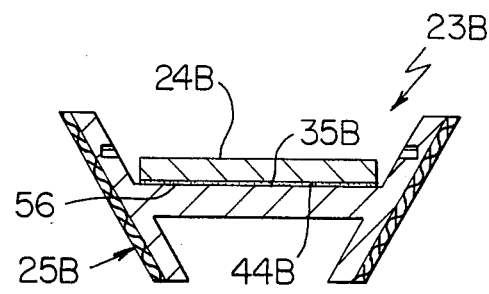
FIG. 8 is a view similar to FIG. 7 and illustrates another endless power transmission belt construction formed from the belt element illustrated in FIG. 7.

For example, reference is now made to FIG. 8 wherein another belt construction is generally indicated by the reference numeral 23B and parts thereof similar to the belt constructions 23 and 23A previously described are indicated by like reference numerals followed by the reference letter "B".

As illustrated in FIG. 8, the belt element 25B does not have the pin 48 or 48A associated therewith and the carrier means 24B has its lower surface 44B secured directly to the transverse shoulder means 35B of the block of material 26B by a suitable adhesive means 56 as illustrated whereby the transverse belt elements 25B cannot slide relative to the carrier means 24B as in the belt constructions 23 and 23A previously described.

In view of the above, it can be seen that this invention not only provides an improved endless power transmission belt construction and method of making the same, but also this invention provides an improved transverse belt element for such an endless power transmission belt construction.

While the forms and methods of this invention now preferred have been illustrated and described as required by the Patent Statute, it is to be understood that other forms and method steps can be utilized and still fall within the scope of the appended claims.

What is claimed is:

1. In an endless power transmission belt construction comprising an endless flexible carrier means having an inside surface means and an outside surface means, and a plurality of transverse belt elements assembled on said carrier means, each said belt element having a recess therein defining an intermediate transverse shoulder means for engaging said inside surface means of said carrier means and a pair of inwardly facing shoulder means confining said carrier means therebetween, each inwardly facing shoulder means having an opening interrupting the same and being aligned with said opening in the other inwardly facing shoulder means of its respective belt element, each said belt element having a pin provided with opposed ends respectively disposed in said openings of said inwardly facing shoulder means thereof whereby said carrier means is confined between said pin and said transverse shoulder means of each said belt element, the improvement wherein said pin of each said belt element has its said opposed ends snapfitted into said respective openings of said inwardly facing shoulder means thereof.

2. A belt construction as set forth in claim 1 wherein said inwardly facing shoulder means of each said belt element converge toward each other as they approach said transverse shoulder means of their respective belt element.

3. A belt construction as set forth in claim 2 wherein each said inwardly facing shoulder means of each said belt element is substantially flat.

4. A belt construction as set forth in claim 1 wherein each said belt element has an exterior surface means and each said opening thereof extends from its respective inwardly facing shoulder means to a point short of said exterior surface means thereof.

5. A belt construction as set forth in claim 4 wherein each said belt element comprises a block of material having external opposed angled surfaces with said recess thereof being disposed intermediate said angled surfaces, each said belt element having friction material on said angled surfaces thereof and defining part of said exterior surface means thereof.

6. A belt construction as set forth in claim 5 wherein each said opening of each said belt element extends in the respective block of material to a point short of its adjacent angled surface.

7. A belt construction as set forth in claim 5 wherein each said opening of each said belt element interrupts its adjacent angled surface and is covered by its respective friction material.

8. In a method of making an endless power transmission belt construction comprising the steps of providing an endless flexible carrier means having an inside surface means and an outside surface means, assembling a plurality of transverse belt elements on said carrier means, forming each said belt element to have a recess therein defining an intermediate transverse shoulder means for engaging said inside surface means of said carrier means and a pair of inwardly facing shoulder means confining said carrier means therebetween, forming each inwardly facing shoulder means to have an opening interrupting the same and be aligned with said opening in the other inwardly facing shoulder means of its respective belt element, and forming each said belt element to have a pin provided with opposed ends respectively disposed in said openings of said inwardly facing shoulder means thereof whereby said carrier means is confined between said pin and said transverse shoulder means of each of said belt element, the improvement comprising the step of snap-fitting said opposed ends of each said pin into its respective openings of said inwardly facing shoulder means of its respective belt element.

9. A method of making a belt construction as set forth in claim 8 and including the step of forming said inwardly facing shoulder means of each said belt element to converge toward each other as they approach said transverse shoulder means of their respective belt element.

10. A method of making a belt construction as set forth in claim 9 and including the step of forming each said inwardly facing shoulder means of each said belt element to be substantially flat.

11. A method of making a belt construction as set forth in claim 8 and including the steps of forming each said belt element to have an exterior surface means, and forming each said opening to extend from its respective inwardly facing shoulder means to a point short of said exterior surface means thereof.

12. A method of making a belt construction as set forth in claim 11 and including the steps of forming each said belt element to comprise a block of material having external opposed angled surfaces with said recess thereof being disposed intermediate said angled surfaces, and securing friction material on said angled surfaces of each said block to define part of said exterior surface means of the respective belt element.

13. A method of making a belt construction as set forth in claim 12 and including the step of forming each said opening of each said belt element to extend in the respective block of material to a point short of its adjacent angled surface.

14. A method of making a belt construction as set forth in claim 12 and including the step of forming each said opening of each said belt element to interrupt its adjacent angled surface and be covered by its respective friction material.

15. In a transverse belt element for an endless power transmission belt construction comprising an endless flexible carrier means having an inside surface means and an outside surface means and a plurality of said transverse belt elements assembled on said carrier means, said belt element having a recess therein defining an intermediate transverse shoulder means for engaging said inside surface means of said carrier means and a pair of inwardly facing shoulder means for confining said carrier means therebetween, each inwardly facing shoulder means having an opening interrupting the same and being aligned with said opening in the other inwardly facing shoulder means, said belt element having a pin provided with opposed ends respectively disposed in said openings of said inwardly facing shoulder means thereof whereby said carrier means is adapted to be confined between said pin and said transverse shoulder means of said belt element, the improvement wherein said pin of said belt element has its said opposed ends snap-fitted into said respective openings of said inwardly facing shoulder means thereof.

16. A belt element as set forth in claim 15 wherein said inwardly facing shoulder means of said belt element converge toward each other as they approach said transverse shoulder means.

17. A belt element as set forth in claim 16 wherein each said inwardly facing shoulder means of said belt element is substantially flat.

18. A belt element as set forth in claim 15 wherein said belt element has an exterior surface means and each said opening thereof extends from its respective inwardly facing shoulder means to a point short of said exterior surface means thereof.

19. A belt construction as set forth in claim 18 wherein said belt element comprises a block of material having external opposed angled surfaces with said recess thereof being disposed intermediate said angled surfaces, said belt element having friction material on said angled surfaces thereof and defining part of said exterior surface means thereof.

20. A belt element as set forth in claim 19 wherein each said opening of said belt element extends in said block of material to a point short of its adjacent angled surface.

* * * * *